US006285668B1

(12) United States Patent
Kang

(10) Patent No.: US 6,285,668 B1
(45) Date of Patent: Sep. 4, 2001

(54) METHOD FOR IMPROVING THE SELECTION CAPABILITY OF A TSB IN CDMA AND PCS SYSTEMS

(75) Inventor: Mi Jung Kang, Seoul (KR)

(73) Assignee: Samsung Electronic Co., Ltd. (KR)

( * ) Notice: Subject to any disclaimer, the term of this patent is extended or adjusted under 35 U.S.C. 154(b) by 0 days.

(21) Appl. No.: 09/094,806

(22) Filed: Jun. 15, 1998

(30) Foreign Application Priority Data

Jun. 14, 1997 (KR) ............................................... 97-024739

(51) Int. Cl.[7] ...................................................... H04Q 7/20
(52) U.S. Cl. ............................. 370/331; 370/342; 455/525
(58) Field of Search ..................................... 370/331, 335, 370/342; 455/436, 442, 439, 445, 450, 525

(56) References Cited

U.S. PATENT DOCUMENTS

| | | | |
|---|---|---|---|
| 5,375,140 | 12/1994 | Bustamante et al. | 370/335 |
| 5,475,870 * | 12/1995 | Weaver, Jr. et al. | 455/67.1 |
| 5,570,349 | 10/1996 | Bustamante et al. | 370/335 |
| 5,594,720 | 1/1997 | Papadopoulos et al. | 370/330 |
| 5,737,330 * | 4/1998 | Fulthorp et al. | . |
| 5,752,198 * | 5/1998 | Frichtel et al. | 455/524 |
| 5,796,722 * | 8/1998 | Kotzin et al. | 370/252 |
| 5,812,540 * | 9/1998 | Bruckert et al. | 370/332 |
| 5,828,661 * | 10/1998 | Weaver, Jr. et al. | 370/331 |
| 5,854,981 * | 12/1998 | Wallstedt et al. | 455/439 |
| 5,883,888 * | 3/1999 | St-Pierre | 370/331 |
| 5,987,326 * | 11/1999 | Tiedemann, Jr. et al. | 455/442 |

* cited by examiner

*Primary Examiner*—Suwa S Rao
*Assistant Examiner*—Saba Tsegaye
(74) *Attorney, Agent, or Firm*—Dilworth & Barrese, LLP

(57) ABSTRACT

The present invention provides an enhanced method for initiating the selection of frames arriving from multiple base stations in a mobile communications system during a soft handoff condition. The method includes the steps of determining a number of base stations in an active set; receiving and storing a plurality of frames from those base stations in the active set where each frame is associated with a frame sequence. The method further includes the step of initiating selection of one of a plurality of received frames of a sequence upon satisfaction of at least one of a plurality of selection criteria which are based upon the active set and the received frames. Preferably, selection is performed immediately upon satisfaction of at least one selection criterion which includes: consecutively receiving all frames in a current sequence from the active set; receiving a frame from a sequence having a sequence number greater than a sequence number of a previously selected frame by a predetermined value; and consecutively receiving all frames in a delayed sequence from the active set prior to receiving all frames in a current sequence from the base stations.

11 Claims, 2 Drawing Sheets

ARRIVAL TIME

METHOD FOR IMPROVING THE SELECTION CAPABILITY OF A TSB IN CDMA AND PCS SYSTEMS

BACKGROUND OF THE INVENTION

1. Field of the Invention

The present invention relates to a method for improving the selection capability of a TSB (Transcoder and Selector Bank) in a mobile communication system, and more particularly for performing effective selection in the presence of delay between frames resulting from a soft handoff operation.

2. Description of the Prior Art

A mobile communication system, such as PCS (Personal Communications Services) and CDMA (Code Division Multiple Access), is generally composed of a large number of base stations (BS) which include several base station transceiver subsystems (BTS) operating under the control of a base station controller (BSC). These systems further includes base station managers (BSM) managing many BSCs, mobile switching centers (MSC) and location registration systems for tracking the position of mobile stations (MS) within the system. Each base station has an associated coverage area generally referred to as a cell. A cell is generally divided into three sectors. A communication system taking a cell as the basic unit of coverage area is called a cellular system. As an MS moves to the periphery of one cell towards another, an ongoing call of the MS will be automatically transferred from one BS to another in a process known as handover or handoff.

Normally, an MS communicates with a BTS serving the sector of the cell in which the MS currently resides. A channel operating from a BS toward an MS is referred to as a forward channel and a channel formed from MS toward BS is referred to as a reverse channel.

The forward channel includes a pilot channel, a sync channel, a paging channel and several forward traffic channels. The reverse channel includes an access channel and a reverse traffic channel. The MS and BTS communicate voice and data information over one of the traffic channels. The received signal strength of the pilot channel is used to determine when handoffs will occur.

Each BTS is assigned several operating frequencies on which a number of channels are established according to system capacity. We call each frequency channel a FA (Frequency Assignment). A CDMA system can include a great number of access channels in accordance with differing requirements from frequency offset and sequences per frequency channel.

As an MS operates near the coverage border of a cell, the wireless telephone system effects a handoff between a currently operating base station and one or more additional base stations. It is an objective of the system to perform the handoff with no interruption of communication. As an MS operates, it has to reregister periodically on the system by transmitting many parameters to the active BS while in an idle state. While a call is ongoing, the MS, BS and MSC cooperate to manage communications between BS and MS to maintain good radio link efficiency.

In CDMA (and wideband CDMA) technology, it is possible for a system to receive mobile transmission from more than two BS's at the same time. Further, an MS can receive transmissions from two or more BS's simultaneously. This feature makes it possible to efficiently handoff an MS from a BS to another BS or from a first sector within a cell to another sector within the cell using enhanced handoff techniques which maintain the quality of signal and voice information during handoff.

In a CDMA cellular and PCS system, many kinds of handoff are provided to guarantee the continuity of a call. The various handoff methods offer various tradeoffs related to efficiency and reliability of continuity of call and system load due to the method and implementation content. The establishment of a channel by a handoff operation is called add and the cancellation of a channel by handoff is called drop. Handoff methods are widely classified into soft handoffs and hard handoffs. A soft handoff operates in a make-before-cut method which guarantees continuity of call by establishing two or more simultaneous communication "highways" for one call. A hard handoff is a cut-before-make method which only uses one communication channel at a time. In a CDMA system, the majority of handoffs take the form of soft handoffs. In cases when a soft handoff cannot be achieved, the continuity of a call is guaranteed by a hard handoff.

In general, an MS determines when a handoff is required by evaluating a pilot-to-interference ratio (PIR) of a received pilot channel signal. When this value for any cell exceeds a minimum threshold value, this is reported by the MS and that cell is added to an "Active Set" of base stations. When the PIR of an active cell diminishes significantly relative to the other cells in the active set, that is reported by the MS and that cell is dropped from the active set. Typically, the add threshold is a fixed threshold value where the drop threshold is a relative threshold value based on the performance of all cells in the active set.

Because CDMA can establish multiple highways simultaneously on a given operating frequency by using different codes, soft handoff methods are particularly well suited for CDMA, which is capable of composing plural highways for one call. Because of the possibility of composition of two or more than highways simultaneously, the best call quality among multiple highways can be determined and then selected, whereby the whole quality and continuity of call is remarkably enhanced.

Soft handoffs are further divided into inter-cell handoff, inter-BSC handoff, and the like. Inter-cell handoff refers to simultaneously operating an ongoing call on two or more adjacent cells for one MS. Inter-sector handoff refers to a handoff between two sectors within the same cell. An inter-sector handoff is also referred to as softer handoff. Softer handoff is similar to soft handoff but there is a difference in source management and assignment. Because channel elements in a cell can handle highways of two sectors simultaneously, unlike soft handoff, softer handoff does not need the additional channel elements.

Soft handoffs occur when an MS resides in an area of overlapping cell coverage. The MS makes up traffic frames coming from each BS and transmits it into each BS again. Each BS then sends the received frame compound to the BSC, and the BSC applies frame quality metrics to select the best quality frame among the received traffic frames. This is referred to as selection diversity where the best of the N available copies of each frame are used. Frame selection is a very important algorithm because the quality of the selected frame can be a reason of cutting a call on an upper layer.

During a soft handoff, an MS is receiving signals from two or more BS. Each of these signals include reverse power control bits which instruct the MS to raise or lower its operating power in order to maintain a minimum effective power level. As the multiple sites are often not collected, the MS is likely to receive conflicting power adjustment instructions. To avoid undesirable signal deterioration in this condition, an MS only lowers its operating power when all cells in the active set report that the power of the MS should be decremented.

An additional consideration during a handoff is that the frames arriving from cells in the active set which are spatially separated do not arrive at the TSB simultaneously. As a result of the different physical path lengths between cells, the frames actually arrive with a slight delay between them. This condition is illustrated in FIG. 1. In the view of the time domain, even if there is only a slight time difference in the arrival time of the frames from the active set, this delay accumulates during the selection process rendering the total delay time excessive.

The step of selecting frames from the cells in the active set is performed by the TSB in the BSC. The selection process insures that if a status of one cell in the active set is bad while the status from another cell in the active set is good, reliable communication will be maintained by this function. The TSB carries out selection by comparing a sequence of frames currently being received with a sequence of frames previously received to determine the expected number of frames available for the selection process. During normal operation of a call, only one BS is handling the call for the MS, and the expected frame sequence is 1. During a soft handoff, several BS are in the active set, and the expected sequence is equal to the number of cells in the active set. However, the TSB is not aware of when cells are added or dropped from the active set and therefore must investigate when the sequence number changes prior to selection, thereby adding time to the selection process.

FIG. 1 illustrates an exemplary conventional frame selection operation viewed in the time domain. As illustrated, a frame A 101 arrives first, followed by a frame B 102 and then a frame C 103, each with a successive delay. The frames are selected by the TSB and then transmitted into a vocoder in the BSC only after the arrival of the last expected frame in the sequence, which in this case is frame C 103. The frame A 101, which arrived first is evaluated to determine whether selection is suitable or not. During this process, if a frame of another cell does not arrive within a predetermined time, the frame A 101 is considered unfit because only a single frame has been received. If the frame B 102 reaches the TSB after frame A 101 is considered unfit or during the period when the suitability of frame A 101 is being determined, the TSB repeats the selecting step. After frame C 103 arrives, the three frames are considered and finally the selection is performed.

The conventional TSB performs this selection process without any information about soft handoff. Therefore, the TSB has to investigate unknown frames of all cells and there are many losses due to this. For example, in the case where each frame arrives with a delay in a first cell and without a delay in another cell, it is possible that a sequence 2 from an undelayed cell arrives earlier than sequence 1 from a delayed cell. In this case, because more than one frame is received from the undelayed cell, satisfying the initial selection requirement of plural frames, the undelayed frames are selected without waiting for the frame of the delayed cell (sequence 1) nor giving consideration to the quality of the frames from the delayed cell. Once this occurs, frames from the delayed cell may be permanently excluded from selection even though that BS remains in the active set.

The problems just described associated with delayed arrival time are especially acute during a soft handoff between MSC's within a system. As the frames from various MSC's are trasnsported via a router, significant delay times are incurred The selection initiation process operating as described above causes time loss, on account of checking up quality in each arrival of the frame and repeating the evaluation operation if no successive frame is received. Also, because the delayed frame is not used, eventually, the cell transmitting the delayed frame can be permanently excluded from selection of a frame.

SUMMARY OF THE INVENTION

To overcome the problems with the prior art as noted above, the present invention minimizes time loss associated with the frame selection process. The present invention eliminates the need to check frames of all cells in an unknown situation by determining whether a cell is an add state of handoff or not and performing selection knowing the number of cells currently in the active set. It is also an object of the present invention to provide a method for improving a frame selection function of a TSB, thereby reducing the system error rate.

In accordance with a first method of the present invention, a method for use in a mobile communications system for initiating the selection of one of a plurality of received frames during a handoff state includes the steps of determining a number of base stations in an active set; receiving and storing a plurality of frames from those base stations in the active set where each frame is associated with a frame sequence. The method further includes the steps of initiating selection of one of a plurality of received frames of a sequence upon satisfaction of at least one of a plurality of selection criteria which are based upon the active set and the received frames.

In accordance with a further method for initiating the selection of one of a plurality of received frames, the selection criteria include: consecutively receiving all frames in a current sequence from the active set; receiving a frame from sequence having a sequence number greater than a sequence number of a previously selected frame by a predetermined value; and consecutively receiving all frames in a delayed sequence from the active set prior to receiving all frames in a current sequence from the base stations. Preferably, the selection is initiated immediately upon satisfaction of one of the selection criteria in order to expedite the selection process. In this way, additional delays are avoided.

These and other objects, features and advantages of the present invention will become apparent from the following detailed description of illustrative embodiments thereof, which is to be read in connection with the accompanying drawings.

BRIEF DESCRIPTION OF THE DRAWINGS

The invention will be described in the following description of preferred embodiments with reference to the following figures, wherein.

DETAILED DESCRIPTION OF PREFERRED EMBODIMENTS

When a BSC receives frames from several cells during a soft handoff, the TSB selects a frame from the received frames coming from each cell and transmits the selected frame to an upper vocoder. The TSB operating in accordance with the present invention manages and saves cell information resulting from add or drop during a handoff (i.e., current active set), and then carries out frame selection based in part upon the current number of cells in the active set. This makes it possible to select frames from among all cells in the present active set.

Figure 1:
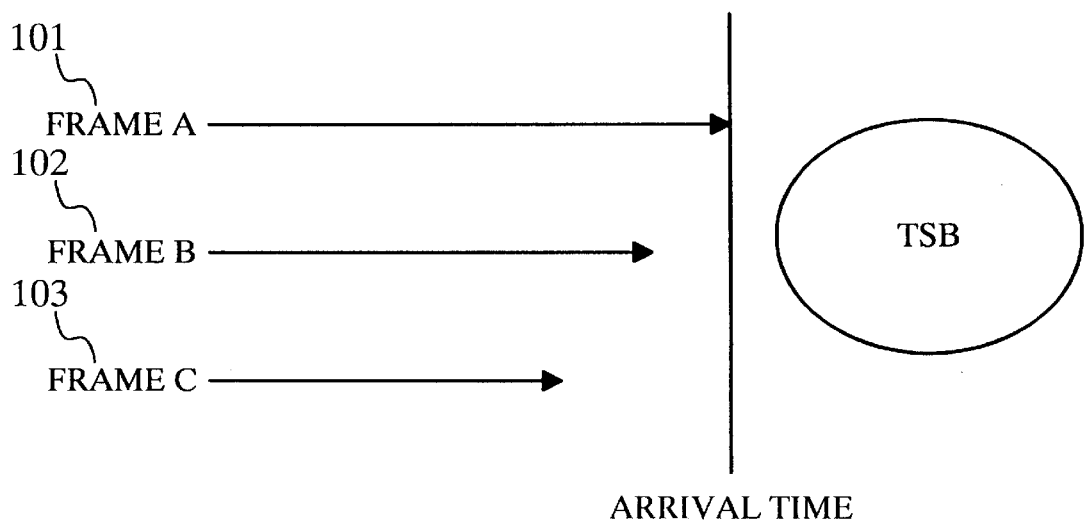
FIG. 1 is a diagram illustrating the frame arrival scenario which triggers frame selection in mobile communications systems known in the prior art.
Figure 2:
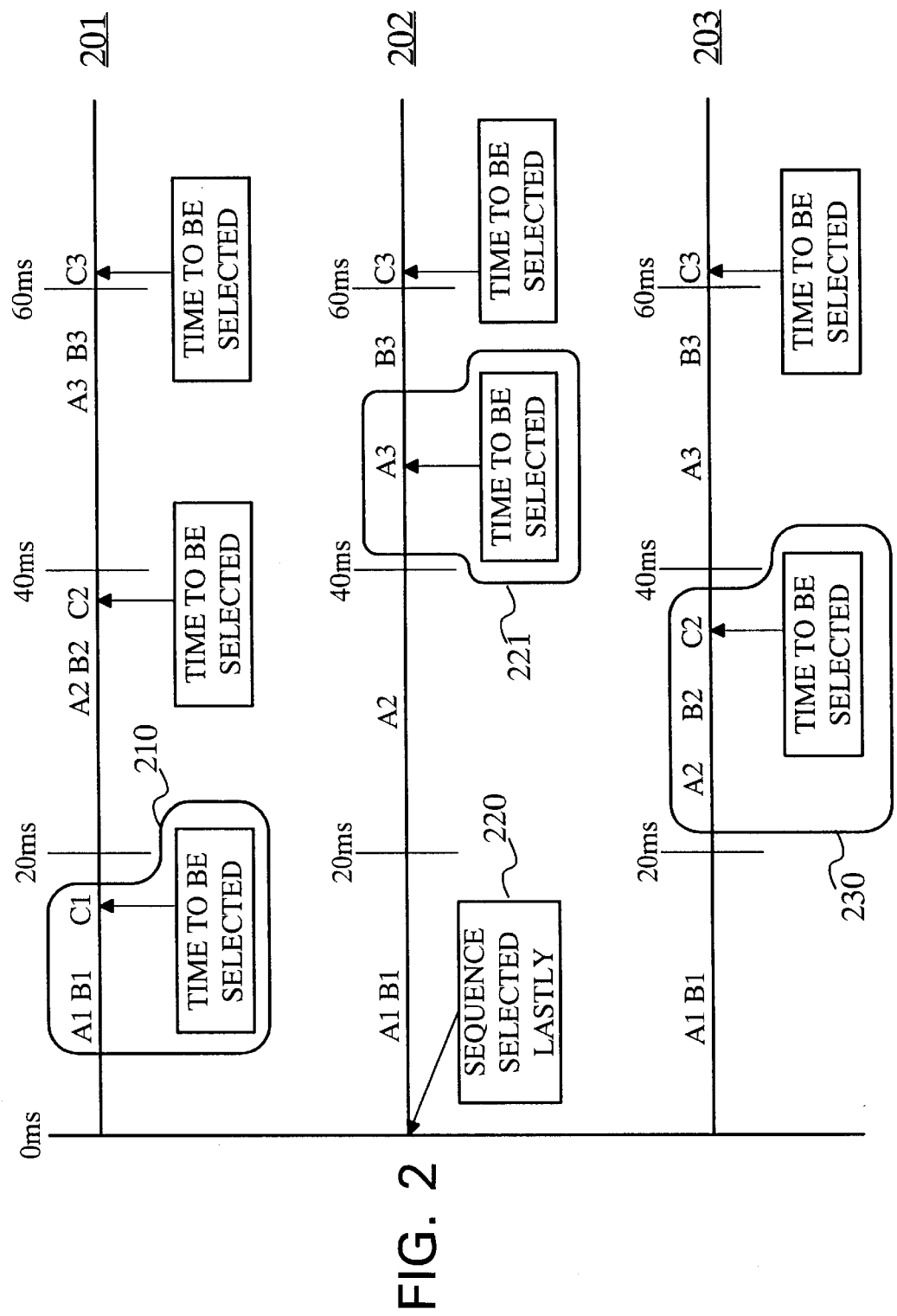
FIG. 2 is a diagram illustrating exemplary frame arrival scenarios which trigger frame selection in accordance with the present invention, wherein $A_i$, $B_i$ and $C_i$ refer to the ith frame arriving from base stations A, B and C respectively.

FIG. 2 illustrates various exemplary frame arrival scenarios which invoke different selection criteria in accordance with the present invention. In FIG. 2, the current active set includes BS designated A, B and C where $A_i$, $B_i$ and $C_i$ refer to the ith frame that has come from base stations A, B and C respectively.

The first case is illustrated in time line 201. In this case, the frames Ai, Bi and Ci arrive consecutively 210 with a short delay between successive arrivals. In accordance with a first selection criteria of the present invention, the TSB does not instantly select a frame based in the initial arrival of Ai. Rather, the TSB stores arriving frames until the frame for a current sequence is received from each BS in the active set. In time line 201, when the received frame matches the number of BS in the active set, the TSB performs frame selection based upon frame quality metrics.

A second arrival case is depicted in time line 202. In this case, the frames are not consecutively received and there is a difference of more than three between the sequence of a currently arriving frame and the sequence of a frame last selected. For example, if the sequence selected lastly 220 is 0, a difference of three sequence numbers between received frame A3 and 220 results. At this point, even if the number of received frames is not equal to the number of BS in the active set, the TSB performs selection without additional waiting. In other words, the selection process is achieved using only the previously received frame(s). In case 202, on the arrival of A3, is selection made for sequence 1 using A1, B1. The frame excepted by this selection process, A2, is saved in a buffer and is used for a subsequent selection process when the frames having same sequence are received.

A third arrival case is illustrated in time line 203. In this case, after the arrival of frames A1 and B1, all frames from the active set for sequence two (A2, B2, C2) are received consecutively prior to the arrival of frame C1. In this case, the TSB performs selection on the frames of sequence 2 upon the arrival of frame C2. Upon the arrival of frame C2, selection of a frame for sequence 1 also performed based on A1, B1.

If selection is carried out according to satisfying conditions described above, the TSB performs selection by selecting a frame of good quality among the accumulated frames in the order of quality.

In accordance with a method of the present invention, the TSB selects a frame of a sequence upon the occurrence of one of at least three specific conditions. First, a frame will be selected when a set of frames are received in order corresponding to the number of BS in the active set 201. Second, a frame will be selected when there is a difference of more than three between the sequence last selected and the sequence of the presently received frame 202. Third, a frame is selected when a sequence of delayed frames are received in order and correspond to the number of BS in the active set 203.

In other cases, the TSB waits a frame for another cell or maintains an idle condition until one of the above selection criteria is satisfied. The idle condition includes a state of waiting a frame and even a state just after selection of a frame.

By storing frames received from cells not currently used for selection until further frames of the same sequence are received, it is possible to use frames of all cells in the active set for the selection decision, even in the presence of significant delay. This achieves improved frame selection quality resulting in overall improved call quality.

Having described preferred embodiments of the present invention, it is noted that modifications and variations can be made by persons skilled in the art in light of the above teachings. It is therefore to be understood that changes may be made in the particular embodiments of the disclosed invention which are within the scope and spirit of the invention as outlined by the appended claims.

What is claimed is:

1. A method for use in a base station controller of a mobile communications system for initiating the selection of one of a plurality of received frames during a handoff state comprising the steps of:

determining a number of base stations in an active set;

receiving and storing a plurality of frames from said base stations in said active set, each said frame being associated with a first sequence; and initiating a selection of one of the plurality of received frames associated with the first sequence, said selection being initiated upon satisfaction of one of a number of selection initiating criteria, each selection initiating criteria being a function of the order of receipt of the plurality of frames associated with the first sequence.

2. The method for initiating the selection of one of a plurality of received frames as defined by claim 1, wherein said number of selection initiating criteria include:

a. consecutive receipt of all frames associated with the first sequence from said active set;

b. receipt of a frame associated with a sequence subsequent to the first sequence, wherein the subsequent sequence has a sequence number that exceeds a sequence number associated with a previously selected frame by a predetermined value; and c. consecutive receipt of all frames associated with a subsequent sequence from said base stations prior to receipt of all frames associated with the first sequence from said base stations.

3. The method for initiating the selection of one of a plurality of received frames as defined by claim 2, wherein said predetermined value is equal to three.

4. The method for initiating the selection of one of a plurality of received frames as defined by claim 1, wherein the mobile communications system is a CDMA system.

5. The method for initiating the selection of one of a plurality of received frames as defined by claim 1, wherein said selection is performed immediately upon satisfaction of any one of said selection criteria.

6. The method for initiating the selection of one of a plurality of received frames as defined by claim 1, wherein said number of base stations in said active set is adjusted as base stations are added and dropped from said active set during a handoff condition.

7. A mobile communications system of a base station controller providing enhanced selection of one of a plurality of received frames during a handoff state comprising:

means for determining a number of base stations in an active set;

means for receiving and storing a plurality of frames from said base stations in said active set, each said frame being associated with a first sequence; and means for initiating a selection of one of the plurality of received frames associated with the first sequence, said selection being initiated upon satisfaction of one of a number of selection initiating criteria, each selection initiating criteria being a function of the order of receipt of the plurality of frames associated with the first sequence.

8. A mobile communications system as defined by claim 7, wherein said number of selection initiating criteria includes:
   a. consecutive receipt of all frames associated with the first sequence from said active set;
   b. receipt of a frame associated with a sequence subsequent to the first sequence, wherein the subsequent sequence has a sequence number that exceeds a sequence number associated with a previously selected frame by a predetermined value; and
   c. consecutive receipt of all frames associated with a subsequent sequence from said base stations prior to receipt of all frames associated with the first sequence from said base stations.

9. A mobile communications system as defined by claim 8, wherein selection is performed immediately upon satisfaction of one of said selection criteria.

10. A mobile communications system as defined by claim 8, wherein said predetermined value is equal to three.

11. A mobile communications system as defined by claim 7, wherein said mobile communications system is a CDMA system.

* * * * *